May 30, 1972     S. Y. YOSHINO     3,666,600

APPARATUS FOR FORMING LAYUP LAMINATE

Filed March 10, 1969

INVENTOR.
STANLEY Y. YOSHINO

BY Richard D. Seibel

ATTORNEY

United States Patent Office 3,666,600
Patented May 30, 1972

3,666,600
APPARATUS FOR FORMING LAYUP LAMINATE
Stanley Y. Yoshino, Monterey Park, Calif., assignor to North American Rockwell Corporation
Filed Mar. 10, 1969, Ser. No. 805,595
Int. Cl. B32b 31/00
U.S. Cl. 156—382                                3 Claims

ABSTRACT OF THE DISCLOSURE

A technique is described for preparing glass fabric laminates bonded with polyaromatic resins such as polyimide. A vacuum bag layup arrangement having polyimide prepregs covered with a porous release layer and a layer of bleeder fabric having a substantial void volume is provided for accommodating a flow of solvent and resin from the prepregs. An impervious border around the layup prevents edge bleeding of the resin. Special paths to the vacuum connections are provided from the bleeder layer. A two stage pressurized curing cycle is also provided so that properties of the composite laminate are controlled and low processing costs are encountered.

BACKGROUND

Figure 1:
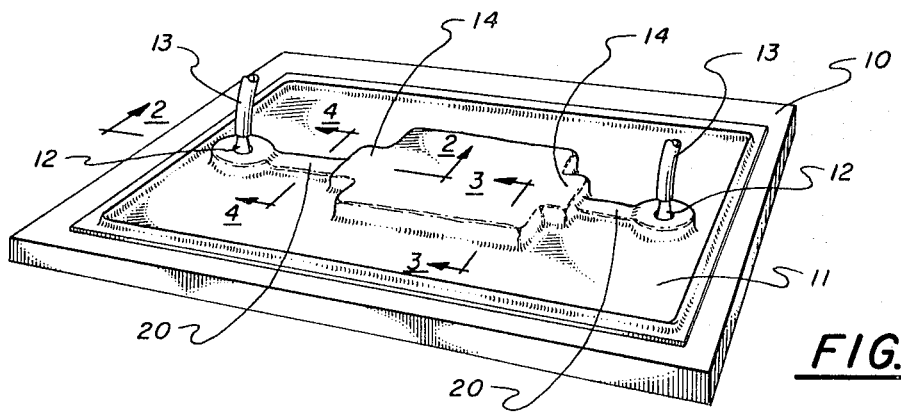

Vacuum bagging techniques have been employed for many years for preparing glass fabric laminates bonded with phenolic or epoxy resins. In these techniques the resin is impregnated in a glass fabric sheet known as a prepreg. The resin in the prepreg is usually uncured or may be partly curred before use. In order to form a structural part from the prepregs, a sufficient number to form the desired thickness of the part are fitted onto a mold and a release layer porous to gases but essentially impervious to the liquid resins is laid over the assemblage of prepregs. One or two sheets of glass fabric, known as bleeders, are laid over the entire assemblage and draped over the mold to provide a path for gas flow to a vacuum connection. An impervious flexible sheet is laid over the bleeder fabrics and sealed at the edge with putty to form a vacuum tight assembly. The assembly is then evacuated so that atmospheric pressure applied through the flexible sheet compresses the prepregs tightly onto the mold. If desired, the part may be placed in an autoclave so that the pressure applied is augmented above the 15 p.s.i. atmospheric pressure available. The part is then heated, while in the vacuum bag, to the curing temperature for the particular resin system and the prepregs are thereby rigidly bonded together to form a structural part.

With the advent of polyaromatic resins such as polyimide, polybenzimidizole, polysulfone, and polyphenylene new problems have arisen in vacuum bagging techniques. In the conventional epoxy and phenolic resins the uncured prepregs are tacky and the resins have a very high viscosity. As heating commences, the cure of the resin commences at a relatively low temperature and the consequent increase in viscosity at the commencement of gelling offsets any decrease in viscosity which might be expected as the temperature increases. In the polyaromatic resins, on the other hand, the resin coating includes solvents to provide tack and drapability. Gelling of the polyaromatic resin does not commence until an elevated temperature is reached and the viscosity of the resin coating on the fabric drops off to a very low value as the temperature is increased prior to the commencement of curing. In the phenolic and epoxy resin systems the high viscosity prevents substantial resin flow and good structural parts are readily obtained. In the polyaromatic resins, on the other hand, the low viscosity of the resin mixture can result in catastrophic resin flows, yielding low strength, out of tolerance parts, plugged up vacuum system, and the like. It is therefore desirable to provide a processing technique for polyaromatic resins having a low viscosity range prior to cure.

SUMMARY OF THE INVENTION

Thus in the practice of this invention, according to a preferred embodiment, a layup technique and process is provided wherein a bleeder reservoir for excess resin is provided within the vacuum bag with the proportion of bleeders and prepregs selected to provide a controlled basin content in the completed part.

DRAWINGS

Figure 2:
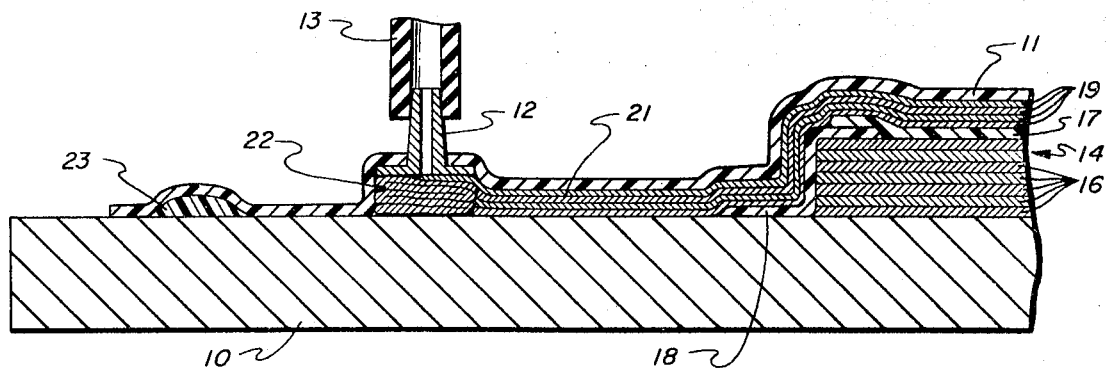
Figures 3, 4:
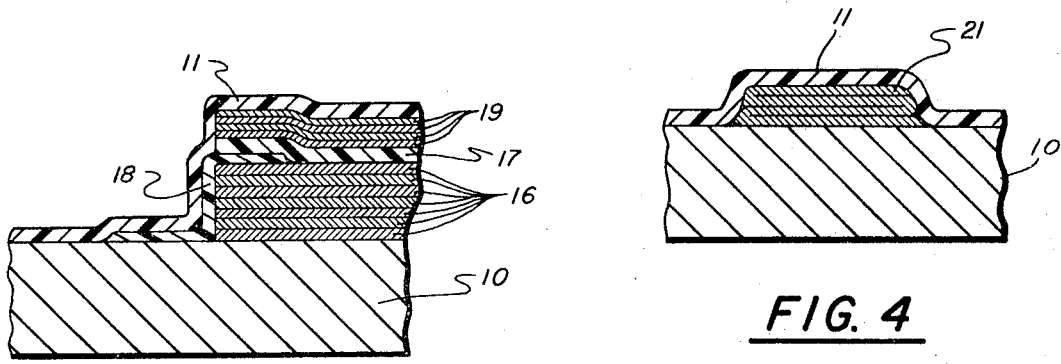

Objects and many of the attendant advantages of this invention will become better understood by reference to the following detailed description when considered in connection with the accompanying drawings wherein:

FIG. 1 illustrates in perspective a typical part contained in a vacuum bag;

FIG. 2 comprises a cross-sectional view through the vacuum bag layup of FIG. 1;

FIG. 3 comprises another cross-sectional view through the vacuum bag layup of FIG. 1; and FIG. 4 illustrates a third cross-section of a portion of the vacuum bag layup of FIG. 1.

Throughout the drawings like reference numerals refer to like parts.

DESCRIPTION

In the following description application of the principles of this invention to polyimide resin composite laminates is detailed. It will be apparent that the principles are also applicable to other polyaromatic resins such as polybenzimidizole, polysulfone and polyphenylene. In a typical application a composite laminated structure made from glass fabric and polyimide resin may be employed as a radome or similar radio or radar transparent structure for high speed aircraft or in an environment otherwise subjected to elevated temperatures. Typical polyimide resins such as PI 3301 available from E. I. du Pont de Nemours and Skybond 700 available from Monsanto, are inherently useful at elevated temperatures, and temperature resistance and strength at elevated temperatures are enhanced by maximizing the content of glass in the composite structure; that is, by minimizing the quantity of resin without compromising the ability to firmly bond the glass fibers together. In such a composite structure it is desirable to achieve a maximum density in order to assure optimum strength and resistance to the elevated temperature environment.

FIG. 1 illustrates a vacuum bag layup incorporating the principles of this invention. As illustrated in this embodiment there is provided a tool or mold 10 which, for purposes of illustration, is merely a flat plate. It will be recognized, of course, that other more complex geometries of mold can readily be employed as is conventional, and the illustration of flat plate mold in FIG. 1 is only for purposes of exposition. The same general principles of vacuum bagging hereinabove described are employed in practice of this invention except that the arrangement of elements in the layup are varied and a two stage cure cycle for polyaromatic resins is employed. Thus, as is conventional, the part being formed is covered by an impervious sheet 11, usually known as a vacuum bag, and vacuum connections 12 are provided with hoses 13 running to a vacuum pump (not shown). In FIG. 1 the general outline of a structural part beneath the vacuum bag 11 can be seen, which, for purposes of illustration, is merely a rectangular flat plate, it being recognized, of course, that the processes are particularly well adapted to parts of complex geometries. There is also provided a tab or coupon 14 on the part adjacent each of the vacuum connections 12.

FIG. 2 illustrates a cross-section of a portion of the layup of FIG. 1 including one of the tabs 14 and a vacuum connection 12. Throughout the drawings exaggerated thicknesses of the layers are shown merely for illustration. As illustrated in this view seven layers of polyimide prepreg 16 are laid directly on the mold 10 which is normally first coated with a thin layer of a conventional release agent to prevent sticking of the part to the mold. The polyimide prepregs comprise, for example, a sheet of glass fabric impregnated with a polyimide resin. The glass fabric prepreg is normally loaded with from 40 to 50 percent of resin by weight which actually comprises about 30 to 40 percent by weight of curable polyimide resin and about 10 to 20 percent of volatile materials. A substantial portion of the volatile material in the prepreg is a high boiling point solvent for the polyimide resin such as n-methyl-2-pyrrolidone pyridine, or dimethyl formamide for providing tack, and some of the volatile material is water released in the condensation reaction of curing of the resin. For this reason some means must be provided in the vacuum bagging arrangement for removing gases from the layup of prepregs during curing not only to remove the high boiling point solvent and the water, but also the air within and between the prepreg layers. The relatively large amount of solvent in the prepregs causes the low viscosity of the resin during the early stages of the curing cycle. The solvent removal tends to carry resin from the prepregs.

The uncured resin is a dry material at room temperature and softens to a honey consistency liquid as it approaches the gelation temperature. Gelling of the resin is a function not only of temperature but also time, and prolonged heating at temperatures as low as 200° F. may cause partial curing. After heating to 275° F. definite irreversible gelation has commenced. In order to provide some tack and drapability in the prepregs before curing and keep them from being too stiff for layup on complex molds, a high boiling point solvent is included in the fabric coating. The solvent is selected with a high boiling point for minimizing solvent losses from the prepreg at room temperatures or slightly elevated temperature. Thus, for example, the preferred solvent, n-methyl-2-pyrrolidone, has a boiling point in excess of 390° F. This permits prolonged storage at room temperautre and some use of heat guns during layup without damage to the prepreg.

During the cure cycle the high boiling point solvent is extracted from the prepreg at a temperature below its normal boiling temperature because the composite being built is evacuated. The solvent can be substantially completely removed below gelation temperatures for the resin by holding for a sufficiently long time in vacuum and unless special layup arrangements are employed resin may also be carried from the part during solvent removal. If this technique is employed the part is vacuum bagged after the solvent removal and cured in a conventional manner to produce high resin content strong parts; however, this technique is expensive since separate layups are needed for solvent removal and curing, with consequent labor costs, and time on the tooling is substantially increased.

In a preferred technique as provided in practice of this invention the solvent is removed at least partly concurrent with gelation of the resin. A controlled volume into which solvent can travel, with resin carried therewith, is provided to control the amount of resin leaving the prepregs. If the solvent is not adequately removed, resin precipitation may occur, yielding low strength inferior laminates. Excessively rapid solvent removal causes increased resin loss from the parts and may yield low strength inferior parts. Solvent removal at low temperatures may also yield a dry prepreg so that poor resting and low density occurs in the final part.

In the past a gas permeable, resin impermeable layer has been provided over the prepregs to vent gases therefrom and prevent the resin from sticking to the vacuum bag, bleeders and the like. In the practice of this invention a release layer 17 permeable to both gases and liquid polyimide resin is provided over the surface of the prepregs. Suitable porous release layers include perforated sheets of polyethylene terephthalate or polytetrafluoro-ethylene (available under the trademarks Mylar and Teflon, respectively, from E. I. du Pont de Nemours and Company, Wilmington, Del.), Teflon fabric, or open weave glass fabric coated with Teflon to prevent adhesion of the polyimide resin to the glass fabric. If desired, aluminum screening coated with Teflon may also be employed as a porous release layer 17.

The porous release layer 17 is made substantially co-extensive with the prepreg layup with the edges of the prepreg sheets 16 and porous release layer 17 being approximately together. By limiting the extent of the porous release layer 17 edge bleeding of the resin from the prepregs is inhibited. In order to further prevent edge bleeding of resin from the part a strip of resin impermeable tape 18 is placed around the periphery of the part being made. The impervious tape 18 which may also be formed of Teflon or similar material is laid over the edges of the prepregs 16 overlapping the edges by a distance of about a half inch. The tape then extends down over the edges of the prepregs to the surface of the mold 10 where it is substantially sealed to the mold or tool by the vacuum bag 11 as is most clearly seen in FIG. 3. It is readily apparent by examination of FIG. 3 that substantially no path exists for edge bleeding from the prepregs 16.

Over the porous release layer 17 there are provided four layers of open weave glass fabric which provide a porous bleeder region which permits gas flow from the prepregs 16 and through the porous release layer 17 to the vacuum connections 12. In addition, the porosity of the glass fabric bleeder layers 19 provides a location for the solvent and resin from the prepregs to flow upon heating of the prepregs during the cure cycle.

As mentioned hereinabove the glass fabric prepregs contain about 30 to 40 percent by weight of curable polyimide resin. It is preferred that the resin content of the finished part be less than about 20 percent by weight of polyimide resin. With such a resin content structural parts made according to prautices of this invention in the thickness range of from about 0.040 to 0.080 inch are dense, strong and substantially nonflammable under extreme conditions such as pure oxygen at atmospheric pressure. With higher resin contents some flammability may be encountered in these thin sections even though polyimide resins are inherently highly flame resistant. Additional details are described in copending U.S. patent application Ser. No. 805,556, filed Mar. 10, 1969 entitled "Polyimide Laminate" by Richard A. Kaumeyer and Stanley Y. Yoshino and assigned to North American Rockwell Corporation, assignee of this application and filed concurrently herewith. The teachings of said copending application are hereby incorporated by reference for full force and effect as is set forth in full herein.

In thicker sections somewhat higher resin contents can be tolerated; however, processing as provided in practice of this invention yields strong, dense, non-flammable parts in any reasonable thickness. It is also preferred that the specific gravity of the parts be greater than about 1.6 after curing since lower densities indicate substantial porosity in the part with consequent loss of strength and increased flammability. It might be noted that low resin content is often associated with low strength in the part and, in fact, some small decrease in strength is noted as the resin content decreases from about 20 percent to about 15 percent. Because of the processing technique employed, however, adequate strengths are maintained even at the lower resin contents.

Strength is assured by providing an excess of polyimide resin in the prepregs and controllably bleeding the resin from the part during processing so that the resin content is controlled and uniform over the entire part. Low resin content parts made low resin content raw materials have been found to be so weak in some circumstances that they can be delaminated with one's fingers. Where the resin content of the prepregs is initially high and excess resin is controllably bled from the part under substantial processing pressures it is found that the glass fabric is reliably compacted for maximum density in the part and optimum strength. This is believed to be due to the flow of low viscosity resin through the part during processing as the excess resin is permitted to flow from the prepregs into the void volume of the bleeder fabric.

In a typical embodiment the prepregs employed are of type 181 glass fabric which is a relatively tight weave commonly employed in laminating. Such fabric pre-impregnated with polyimide resin is commercially available from Du Pont, U.S. Polymeric, and Narmco. In the embodiment illustrated herein seven sheets of such a glass fabric prepreg 16 are employed to make the final structural part. The glass fabric of the bleeder layer is preferably a very open weave scrim cloth such as type EM-10A-1100 which has a large void volume. In the illustrated embodiment four layers of such a scrim fabric 19 are employed to absorb resin from the prepregs. It will be apparent that other types of fabric can just as well be employed for the bleeder layers and it is also found that aluminum screening makes a quite satisfactory bleed layer.

A significant factor in the bleed layer is the void volume available for accommodation of resin flowing from the prepregs. It is preferred that the void volume in the bleeder layer be greater than about 18 percent of the volume of the prepregs. This provides sufficient void volume in the bleeder layer to accommodate excess resin from the prepregs and results in a resin content in the cured part of less than about 20 percent. If less than about 18 percent void volume is available insufficient resin flow from the prepregs occurs to bring the final resin content down to 20%. When a higher proportion of void volume is available in the bleeder layer, additional resin is extracted from the prepregs during the cure cycle up to an amount sufficient to lower the resin content of the finished part to about 15 percent. It is found that indefinite increase of the bleeder volume does not result in resin contents lower than about 15 percent since this is all of the resin that can be squeezed out of the prepregs by the processing pressures.

With the above identified prepregs and scrim fabric in the bleeder layer there are in the illustrated embodiment four layers of bleeder fabric for the seven layers of prepreg. Generally speaking, for these materials it is preferred that the number of layers be approximately in the ratio of two bleeder layers for every three prepreg layers. Thus, for example, when the number of style 181 glass fabric prepregs is three, four, five, six, seven, eight and nine the number of EM-10A-1100 fabric bleeder layers is preferably two, three, three, four, four, five and six, respectively.

Referring again to the drawings, the bleeder fabric sheets 19 are substantially coextensive with the prepreg sheets 16 so that no excess volume exists for edge bleeding of the resin from the structural part. Thus the edges of the bleeder sheets terminate at substantially the same point as the prepreg sheets, as is most clearly seen in FIG. 3. In FIG. 3 the impervious tape 18 is over the prepregs and under the release layer 17. If desired, the tape can be over the bleeder layer 19 without any substantial change in results. If the bleeder layer 19 were terminated at the edge of the part at all points on the periphery, difficulty would be encountered in evacuating the vacuum bag to obtain good uniform loading on the prepregs for the cure cycle. For this reason a "pigtail" of the bleeder layer is provided between the structural part and the vacuum connections. The pigtail 20, outlines of which can be seen in FIG. 1 beneath the vacuum bag 11, comprises narrow strips or a roll of glass fabric 21 similar to the bleeder layers. It will be apparent that some edge bleeding may occur at the location of the pigtails, therefore the tabs or coupons 14 are provided on the structural part at the location of each of the pigtails 20. This provides a small region interconnecting the structural part and the pigtail, and this tab is later trimmed off the edge of the part after curing. The tab 14 can also be employed for various quality control tests if desired and any edge bleeding which may occur in the tab assures conservative test results. In addition to the roll of fabric 21 leading to the vacuum connection 12 a wad of folded fabric 22 is usually provided within the vacuum bag beneath the vacuum connection to provide an additional reservoir for excess resin to prevent plugging of the vacuum lines. The vacuum bag 11 may be formed of silicone rubber, nylon or Mylar sheet or other impervious material for resisting the applied pressure at curing temperature.

In order to cure the polyimide resins the vacuum bag and layup therein is evacuated so that the external pressure on the vacuum bag exerts a uniformly distributed force on the prepregs for obtaining a compact, high density structural part adhering in shape to the mold. A peripheral rim of conventional zinc chromate putty 23 (FIG. 2) or the like is provided for sealing the vacuum bag. In order to obtain optimum density in the part and assure the desired resin flow a pressure higher than atmospheric is employed by placing the entire assembly in an autoclave (not shown) which may, for example, apply a pressure up to 200 p.s.i.g. (that is, about 215 p.s.i.a.) on the prepregs.

In the past polyimide resins have been heated without augmented pressure until curing commences in order to inhibit resin flow from the parts. This may, however, lead to difficulties since the prepregs may become sufficently rigid that poor laminations or low tolerance parts are obtained.

In the preferred two stage process provided in the practice of this invention an augmented pressure of at least 35 p.s.i.g. (50 p.s.i.a.) is applied to the part during the initial stages of the cure cycle to assure intimate contact of the prepregs and the desired flow of resin from the prepregs through the porous release layer 17 and into the bleeder fabrics 19 to fill any small voids in bridges of the vacuum bag over corners of the part. The pressure may later be increased to as much as 200 p.s.i.g. in order to assure maximum density in the part. Thus for a typical polyimide resin a cure cycle may heat the part from room temperature to about 300° F. in from 1½ to 4 hours with an autoclave pressure of from about 35 to 55 p.s.i.g. When the part reaches about 290° F. the autoclave pressure may be increased to the range of from about 100 to 200 p.s.i.g. and the temperature is increased to about 350° F. in about an hour and held for about 3 hours to further the cure of the resin and make the part essentially rigid.

The relatively low pressure applied at the beginning of the curing cycle with increased pressure after heating to about 300° F. permits the use of relatively inexpensive vacuum bagging materials. Silicone rubber sheet can be used for vacuum bagging with the potential of repeated use of the bag, however, in practice it often occurs that the bag is damaged and cannot, in fact, be reused. It is therefore desirable to employ a relatively inexpensive nylon sheet for the vacuum rather than the more costly silicone rubber. It is found, however, on complex parts that if nylon sheet is subjected to full autoclave pressure at the commencement of the heating cycle that tearing may occur where there is bridging of the nylon sheet over reentrant corners and the like in the layup of relatively stiff prepregs, with consequent loss of vacuum. Therefore, an augmented pressure in the range of only about 35 to 55 p.s.i.g. is applied at the commencement of heating to provide appreciable squeezing of the prepregs onto the tooling and extraction of solvent. After heating, both the prepregs and the vacuum bag are more pliant and resin has bled out to the bag in the bleeders, effectively eliminating bridging, and tearing of the sheet is much less likely; therefore the pressure can safely be augmented to 100 to 200 p.s.i.g. This two stage procedure not only permits use of the less expensive nylon sheet vacuum bagging, but also reduces labor costs in that less care is needed in removing the vacuum bag since no effort is made to save the bag for reuse.

After the part is cooled to about 150 to 200° F. the pressure may be released and the part removed from the autoclave. In a typical process the part may then be sanded to remove any wrinkles or high spots and the sanded surface coated with a thin layer of polyimide resin for sealing in a conventional manner. The edges may be trimmed and the tabs at the pigtails removed. It is then preferred to heat the part at elevated temperature to completely extract any high boiling point solvents and completely cure the polyimide resin. A typical "postcure" cycle for the polyimide resin involves heating at 250° F. for two hours, 350° F. for two hours, 450° F. for two hours, 500° F. for two hours and 600° F. for eight hours. This assures a complete cure and a maximum density, strength, and temperature resistance.

Obviously many variations and modifications can be made in the practice of this invention. For example, the exact processing parameters may differ for other polyaromatic resins than the polyimide described in the preferred embodiment. Other desired resin contents can be provided by controlling the resin bleed as taught herein. Many substitute materials for release layers, bleeders, vacuum bags and the like will be apparent to one skilled in the art.

What is claimed is:

1. In an assembled means for pressing and curing sheets of laminated plastics containing volatile and low viscosity resins at elevated temperatures:
   a mold with a hard unyielding surface, said sheets being positioned in a stack, one over the other, on said surface;
   a porous release layer covering the surface of said stack opposite said unyielding surface;
   a bleeder layer covering said release layer and substantially coextensive therewith, and being sufficiently thick to absorb all the resin that may be released by said sheets;
   an impervious membrane covering said bleeder layer;
   a vacuum connection in said membrane; and
   sealing means for making an air-tight seal between said impervious membrane and said unyielding surface so that when a vacuum is drawn through said connection the space between said membrane and said unyielding surface is evacuated;
   the improvement comprising impervious means extending from and sealed to said unyielding surface and surrounding said stack to retain any liquid resin that may be formed when said assembled means is heated to cure said resin.

2. In the combination of claim 1 wherein:
   said impervious means is an impermeable tape placed around the periphery of said stack and forming a suitable bond with said hard surface.

3. In the combination of claim 2 wherein:
   said vacuum connection is disposed in a region over said hard surface and removed from over said stack;
   a bleeder pigtail extending over said tape from said bleeder layer to said vacuum connection forming a passageway so that said volatile and any flowing liquid resins are required to flow up over said tape.

References Cited

UNITED STATES PATENTS

| | | | |
|---|---|---|---|
| 2,713,378 | 7/1955 | Nadler et al. | 156—286 UX |
| 3,423,366 | 1/1969 | Brunner et al. | 161—227 |

FOREIGN PATENTS

| | | | |
|---|---|---|---|
| 142,563 | 3/1949 | Australia | 156—285 |
| 556,533 | 4/1958 | Canada | 156—285 |
| 741,480 | 12/1955 | Great Britain | 156—286 |
| 793,441 | 4/1958 | Great Britain | 161—DIG |

WILLIAM A. POWELL, Primary Examiner

U.S. Cl. X.R.

18—19; 156—285, 289, 323, 500; 161—197, 227; 264—90